United States Patent [19]

Le Paranthoen et al.

[11] 3,719,729

[45] March 6, 1973

[54] ORIENTED POLYPROPYLENE RESIN MODIFIED POLYTHYLENE POLYETHYLENE TEREPHTHALATE FILMS WITH IMPROVED ELECTRICAL PROPERTIES

[75] Inventors: Rene Le Paranthoen, St-Maurice de Beynost; Georges Bonjour, Lyon-Bron, both of France

[73] Assignee: La Cellophane, Paris, France

[22] Filed: May 5, 1970

[21] Appl. No.: 34,858

Related U.S. Application Data

[63] Continuation-in-part of Ser. No. 743,627, July 10, 1968, abandoned.

[30] Foreign Application Priority Data

Aug. 8, 1967 France..............................67117168
Dec. 24, 1969 France..............................6944797

[52] U.S. Cl...................................260/87.3, 264/289
[51] Int. Cl...........................B29g 7/00, C08g 39/10
[58] Field of Search ...............260/873; 264/289, 290

[56] References Cited

UNITED STATES PATENTS

| | | | |
|---|---|---|---|
| 3,432,591 | 3/1969 | Heffelfinger | 264/289 |
| 3,313,870 | 4/1967 | Yazawa | 264/290 |
| 3,361,848 | 1/1968 | Siggel et al. | 260/873 |
| 3,579,609 | 5/1971 | Sevenich | 260/873 |
| 3,585,255 | 6/1971 | Sevenich | 260/873 |

*Primary Examiner*—William H. Short
*Assistant Examiner*—Edward Woodberry
*Attorney*—Sherman and Shalloway

[57] ABSTRACT

Oriented films of polyethylene terephthalate of improved physical characteristics are prepared by introducing into the polyethylene terephthalate during the polycondensation thereof or immediately prior to the extrusion thereof from 0.01 percent to 1 percent by weight of a polypropylene resin. The oriented film of improved physical characteristics is prepared by subsequent monoaxial or biaxial stretching of the extruded film containing the polypropylene resin.

2 Claims, No Drawings

ORIENTED POLYPROPYLENE RESIN MODIFIED POLYTHYLENE POLYETHYLENE TEREPHTHALATE FILMS WITH IMPROVED ELECTRICAL PROPERTIES

This is a Continuation-in-Part of Ser. No. 743,627 filed July 10, 1968, now abandoned.

The present invention relates to oriented films of polyethylene terephthalate of improved physical characteristics and to a method of preparing the same; more particularly, the present invention relates to such oriented films and a method of preparing the same wherein improved characteristics are provided by including within the polyethylene terephthalate oriented film a minor amount of a polypropylene resin.

Oriented films consisting of polyethylene terephthalate are well known in the art, such films generally being capable of being employed in a variety of fields due to their firmness, their good dimensional stability, and many other valuable qualities or characteristics.

However, depending on the particular use for which such films are intended, it has been found desirable to improve the qualities or characteristics of such films most particularly desired for the intended use. In this respect, numerous proposals have been made and developed for this purpose of improving the physical qualities or characteristics of polyethylene terephthalate oriented films useful for particular purposes. Thus, for example, it has been previously proposed to include within such oriented films various materials which possess the necessary functional sites to allow ready dyeing of the films which are inherently not easy to dye. Similarly, various complicated processes of monoaxially or biaxially stretching of extruded polyethylene terephthalate films with heat relaxation processes associated therewith have been proposed in order to attempt to improve the physical qualities or characteristics of the oriented thermoplastic film. While some such processes have been effective for improving the qualities or characteristics of the polyethylene terephthalate oriented films useful for particular purposes, there has still been a great desire to provide a simple and efficient method of substantially and effectively enhancing or improving the basic physical properties or characteristics of oriented films consisting of polyethylene terephthalate.

In the parent application Ser. No. 743,627, filed July 10, 1968, now abandoned, it was disclosed that polyethylene terephthalate films of improved properties were obtained by incorporating therein up to 12 percent of an additional thermoplastic polymer, the melting point of which was at the most equal to that of the polyester. It has been evidenced that these compositions permitted the obtaining of films of noticeably increased homogeneity which caused the improvement of a great many of their physical qualities such as, for example, slipping properties and mechanical solidity, and, also their dielectric rigidity, that is, their resistance to breakdown voltage. These very appreciable results were obtained by the incorporation of up to 12 percent of the additional resin. However, there is a definite advantage in limiting the amount of these added thermoplastic polymers, since such large percentages of additional resin may alter the intrinsic qualities of the original film.

It has now been found that similar results may be obtained by incorporating a considerably more reduced quantity of the additional thermoplastic resin if the latter resin is polypropylene.

It is the primary object of the present invention to provide an improved oriented polyethylene terephthalate film having incorporated in the polyester resin from 0.01 to 1 percent and preferably 0.1 to 0.4 percent of polypropylene.

It is a further objective of this present invention to obtain films of the thickness of between 2.5 and 25 microns starting from a polyester resin containing from 0.1 to 0.4 percent by weight of polypropylene.

Still further objects and advantages of the product and process of the present invention will become more apparent from the following more detailed description thereof.

The above advantages of the present invention are obtained by providing an oriented film of polyethylene terephthalate and the method of producing the same wherein such film contains a minor amount of a polypropylene resin.

Thus, in accordance with the present invention, it has been discovered that by introducing, during the polycondensation of the polyethylene terephthalate or immediately before the extrusion of the product of such polycondensation reaction, a small amount of polypropylene under such conditions that a fine homogeneous dispersion of the added polypropylene in the basic polyethylene terephthalate is obtained. The production of such fine homogeneous dispersion of this polypropylene provides improved physical properties in monoaxially and biaxially stretched films obtained from the resulting mixture.

In carrying out the present invention, any polypropylene resin generally used in the industry is suitable. It is not necessary to use a polypropylene with a determined atactic/isotatic proportion. These polypropylene resins are compatible with polyester resins prepared from catalytic systems both with a manganese base and a calcium acetate base.

The polyethylene terephthalate polyester employed in accordance with the present invention is well known in the art as is the method of producing the same. Thus, such polyethylene terephthalate is generally prepared either by direct polycondensation or ester interchange followed by polycondensation of dimethyl terephthalate or terephthalic acid with ethylene glycol in the presence of a conventional polycondensation reaction catalyst and where appropriate, an ester interchange catalyst. As used throughout the present specification and claims, however, the oriented films of polyethylene terephthalate include not only the homopolyesters of polyethylene terephthalate as the basic thermoplastic polymer component, but also copolyesters wherein the aromatic dicarboxylic acid component and/or glycol component is replaced by a minor amount, i.e., up to about 20 percent by weight of a different aromatic dicarboxylic acid and/or glycol. Thus, for example various conventionally employed aromatic dicarboxylic acids such as isophthalic acid, adipic acid, etc., can be copolycondensed with terephthalic acid or dimethylterephthalate in accordance with the present invention. Similarly, ethylene glycol can be replaced with a minor amount, i.e., up to 20 percent by weight of a suitable 1,2-glycol or 1,3-glycol, e.g., propylene glycol. Of course, the use of such minor amounts of other aromatic dicarboxylic acid or glycol components in accordance with the present invention does not in any way interfere with the chemical or physical properties of the oriented polyester film of the present invention. Again, the polyethylene terephthalate employed in accordance with the present invention embraces any and all homopolyesters and copolyesters of terephthalic acid conventionally employed in the prior art by well known prior art processes.

It has been found in accordance with the present invention that the beneficial effects associated with the inclusion of the minor amount of polypropylene resin is achieved by the introduction of polypropylene during the polycondensation of the polyethylene terephthalate or just before extrusion of the polyethylene terephthalate. This extruded product is subsequently monoaxially or biaxially stretched to produce the oriented thermoplastic film of improved physical properties or characteristics.

It has been found in accordance with the present invention that the addition of a very small quantity of polypropylene improves the physical properties or characteristics of the polyethylene terephthalate film to the same extent as the incorporation of larger amounts of other thermoplastic polymers which heretofore have been added to polyethylene terephthalate. The inclusion of this small amount of polypropylene in the polyethylene terephthalate also does not produce any of the undesirable physical properties the other thermoplastic polymers produce in the polyethylene terephthalate such as the yellowing of the polyester films during aging, for instance, which occurs in the case of the addition of polyamides to the polyethylene terephthalate. This fact allows the production of polyethylene terephthalate oriented films with enhanced properties without in any way destroying the homogeneity of the material or any of the other desirable properties of the polyethylene terephthalate.

The manufacture of polyethylene terephthalate films is further facilitated by the addition of a small quantity of polypropylene, since the polypropylene is a nucleating agent which favors rapid crystallization of the mixture of polyethylene terephthalate and polypropylene.

The polyethylene terephthalate films may easily be produced in thicknesses generally of between 2.5 and 25 microns. This is advantageous for the use in fabrication of condensers and transformers with bands of aluminum which are separated by this insulation film.

Although the amount of polypropylene resin added in accordance with this invention may be between 0.01 and 1 percent by weight, the preferable amount of polypropylene to be added is between 0.1 to 0.4 percent by weight. The preferred range provides ultimal increase in properties of the polyethylene terephthalate with minimal decrease in its other desirable qualities.

Furthermore, the composition of the present invention in addition to containing the polyethylene terephthalate and the polypropylene may also contain various conventional additives and fillers which are normally employed in the preparation of polyethylene terephthalate films and oriented polyethylene terephthalate films in particular.

The films according to the invention are prepared in accordance with the usual methods of preparing monoaxially or biaxially stretched polyethylene terephthalate films. The polyethylene terephthalate prepared in a conventional polycondensation reaction is preferably granulated and then heated in a ventilated oven before extrusion. The polypropylene may be introduced into the supply hopper of the extruder so that homogenization of the mixture commences in the hopper. In order to assist the homogenization of the mixture, the polypropylene is preferably introduced in a finely divided form, for example, in the form of ground film waste. The homogenization is continued in the extruder, in which the molten mixture is worked upon in successive zones in the usual manner, at temperatures, for example, of from 265° to 300°C.

The incorporation of the added polymer can alternatively be effected at the time of the polycondensation of the polyethylene terephthalate by introducing the previously heated thermoplastic resin directly into the reactor at the end of the condensation and allowing the reaction to continue without stirring at the same temperature for a few minutes.

The molten mass is then filtered, to the degree of fineness required for the intended use of the product. The extrusion then takes place under the usual conditions. On leaving the extrusion nozzle, for example, the film may be taken up by a drum which is cooled to a temperature varying from 40° to 80°C., depending on the thickness of the manufactured film.

The film is then stretched (i.e., drawn) under conditions similar to those used with the usual polyethylene terephthalate films, either monoaxially or more usually biaxially. The first stretching may be longitudinal or transverse. The biaxial stretching can optionally be followed by an over-stretching in one or both of the orientation directions. In this way the process can be used for obtaining films in all of the conventional thicknesses.

The stretching can be followed by a heat-setting operation under the conditions required to obtain the desired characteristics of the finished film. If it is desired to obtain a shrinkable film, heat-setting will generally not be carried out.

As seen from above, the manufacturing conditions for the films according to the present invention are essentially the same as those used for ordinary polyethylene terephthalate films. It is, however, found that the manufacture of film in accordance with the present invention is facilitated by working within the scope of the invention, i.e., the introduction of the polypropylene resin. This is shown by the fact that the extrusion pressure measured at the inlet of the filter is substantially reduced and varies within a smaller range, because of the greater homogeneity of the extruded product. This state of affairs could only previously be obtained when manufacturing opaque films containing inert fillers. Now, however, it can be extended to the manufacture of relatively transparent films. The consistency of the extrusion pressure also produces a notably improved consistency of the thickness of the film, and a decrease in the number and size of the striations which are usually observed on the films when they leave the extruder.

As mentioned previously, the inclusion of a minor amount of polypropylene resin in the oriented polyethylene terephthalate film greatly increases the physical properties or characteristics of such oriented film. In this respect, the slipping of the film is vastly improved to a degree which increases as the quantity of the added polypropylene resin is increased. This is easily confirmed by measuring the coefficient of friction in accordance with conventional methods, that is, by measuring with a dynometric ring the forces necessary to cause slippage by a given load when two sheets are applied one against the other. In addition, it has not only been found that the measure of frictional coefficients have a lower mean value when the polyethylene terephthalate films are produced in accordance with the present invention, but also, it has been determined that the value of the frictional coefficients of the films produced in accordance with the present invention are more homogeneous. This is easily shown by reference to reduced oscillations appearing on curves recording the variation of the slipping variables. This improvement in accordance with the present invention is due to the modification of the state of the surface of the oriented polyethylene terephthalate film. This modification of the surface of such film can easily be verified by microscopic examination with indicates that the surface of the polyethylene terephthalate films produced in accordance with the present invention is fine and regular.

In addition to the reduced coefficient of friction between two films produced in accordance with the present invention, the improvement is also observed in the slipping action produced between a polished metal surface and a film produced in accordance with the present invention. This increased slipping action allows for very appreciable technical advantages. Thus, for example, when reeling such a film there is a substantial reduction in the formation of creases, which reduction in the formation of creases substantially reduces the amount of waste.

An appreciable reduction in the coefficient of shrinkage is also obtained in accordance with the present invention. This result, which is obtained by the use of only a small quantity of polypropylene resin, is easily measured, for example, by reference to the shrinkage of a control film, obtained, for example, after a residence time of 30 minutes in an oven at 150°C.

In addition to the other improvements noted above, the production of polyethylene terephthalate oriented films in accorddance with the present invention and containing a minor amount of a polypropylene resin, allows for an improvement in the mechanical qualities of the films obtained. Particularly, an improvement in the resistance to tearing is obtained in accordance with the present invention. Since polyethylene terephthalate films have been in wide demand because of the generally great firmness of such films, any fragility associated with polyethylene terephthalate films is disadvantageous from an economic and demand standpoint. Accordingly, the improvement associated with the present invention by providing an improved resistance to tearing is a tremendous commercial advantage. This improvement can be easily illustrated by using the Elmendorf test, according to which the force necessary to tear a strip of film of given width is measured with a dynomometer. In addition, the present invention provides improvements in other mechanical characteristics of the film, i.e., the breaking resistance and flexibility, for example.

The improvement in the quality of the films produced in accordance with the present invention is also notable with regard to their uses for electrical purposes. The dielectric resistance of these films, that is to say their resistance to breakdown voltage, is greatly increased, and therefore their specific capacity is also greatly increased. This improvement results from the greater homogeneity of the films. It is found that the process of the present invention produces a remarkable decrease in the defects which cause rejection of the films, i.e., as shown by an increased weakness in certain zones, for example, because of holes, inclusions which locally modify the electrical resistivity and heterogeneous crystallization points. The proportion of rejects is therefore greatly reduced.

As well as the advantages referred to above, the process of the invention provides the advantage of substantially reducing the variation in the properties which are obtained in a single film, i.e., with regard to the slipping properties, the dimensional stability and the mechanical or electrical characteristics. This advantage, which arises from the improvement in homogeneity of the films is very important industrially, because it permits a much more precise and more constant quality to be obtained. This precision makes it possible in particular to adjust the quality of polymer incorporated in the polyethylene terephthalate as a function of the result to be obtained, this quantity being variable according to the thickness of the film, according to the qualities which it is desired to improve and the characteristics which it is desired to obtain.

All of these improvements produce very considerable advantages in the use of the films.

For the production of electrical condensers, biaxially oriented polyethylene terephthalate film 2.5 to 25 microns thick is used, which may be metal-coated. Numerous advantages are obtained by using for this purpose films according to the present invention, especially films having incorporated therein 0.1 to 0.4 percent by weight of the polypropylene resin. The use of such film leads to a considerable reduction in manufacturing waste caused by defects during reeling, particularly by the formation of creases or folds. Also, it enables condensers of more homogeneous characteristics to be manufactured. The increase in the specific capacity of the films and also the improvement in their slipping properties enables tighter condensers with a smaller volume to be manufactured while having equal capacity. The improvement in the resistance to breakdown voltage of the films greatly increases the robustness of the condensers and the abnormal and exceptional causes of breakdown are greatly reduced.

In the production of magnetic recording tapes, e.g., recording tapes for sound signals or video signals, for general use or for use in computers, there are biaxially stretched film 20–125 microns thick, or 5–40 microns thick after subjection to a further stretching in one direction are used as supports to give a higher degree of orientation in that direction. It has been found that the microscopic irregularities of such films are dragged off by friction on the surfaces of the guide means and remain adhering to the film, harming the quality of the data on the reading head of the magnetic tape. The use of films according to the present invention, especially containing 0.1 to 0.4 percent by weight of the added polypropylene, results in a considerable improvement in the quality of the tapes and of the data recorded thereon, by eliminating the aforesaid irregularities.

The films of the present invention can also advantageously be used for other purposes, including insulation of rotating or static electrical machines, and the matt films used in graphic arts, etc.

The process and product of the present invention will now be illustrated by reference to the following specific examples. It is to be understood that such examples are presented for purposes of illustration only, and the present invention is in no way to be deemed as limited thereto.

In the following examples, a control film A was prepared without the incorporation of any thermoplastic polymer, the remaining films being prepared in accordance with the present invention.

EXAMPLE 1

Using polyethylene terephthalate prepared with a catalyst system containing calcium acetate, a film A 9 microns thick was extruded at about 275°C., using a conventional extruder. The film was stretched, first longitudinally in a ratio of 1:3.5, and then transversely in the same ratio. The film was then heat-set at a temperature of 210°C.

In preparing film B according to the invention, 0.2 percent by weight of powdered polypropylene was dispersed in the supply hopper of the extruder, and the films were produced in the same manner as film A above.

The coefficients of friction of the films obtained were measured dynametrically:

| Film | Coefficient of Friction |
| --- | --- |
| A | about 1.0 |
| B | 0.5 |

COMPARATIVE EXAMPLE 1

Using polyethylene terephthalate prepared in accordance with procedure of Example 1 a film A 5 microns thick was extruded. 2 percent by weight of powdered Nylon 610 was dispersed in the supply hopper as in Example 1.

The coefficients of friction of the films obtained were measured dynametrically:

| Film | Coefficient of Friction |
| --- | --- |
| A | about 1.0 |
| B | 0.5 |

EXAMPLE 2

Using polyethylene terephthalate film prepared by a means of a calcium acetate catalyst, films 9 microns thick were extruded by the method of Example 1.

The number of conductive points of the films obtained was measured by the following method. It is estimated that a point of the film is conductive when, with the two faces of the film subjected to a voltage of 100 volts, a current of 10 microamperes passes through this point, this representing an ohmic resistance less than 10 megohms.

By recording the mean of the measurements carried out on the following samples, Film A containing no added thermoplastic polymers, Film B containing 2 percent of Nylon 610 added in accordance with Example 2, and Film C containing 0.2 percent of polypropylene added in accordance with Example 1, the following results were obtained:

| Film | Conductive points/sq.meter | % polyamide | % polypropylene |
| --- | --- | --- | --- |
| A | 6 | | |
| B | 1.9 | 2% | |
| C | about 2 | | 0.2% |

The results of Films B and C correspond to a percentage loss below 4 percent with the control of reception of condensers, where these condensers are 0.5 microfarads with aluminum armatures. For similar condensers using the sample Films A, the percentage loss for control of reception was about 8 percent.

By comparison of the results of Example 1 and C.E.1 and the results of Films B and C in Example 2, the similarity of the properties of polyethylene terephthalate film produced incorporating 2 percent of polypropylene and polyethylene terephthalate films produced incorporating 2 percent polyamide is readily observable. This fact coupled with the fact that the incorporation of the smaller amount of polypropylene avoids some of the undesirable properties imparted to the polyethylene terephthalate films by the use of the polyamide mentioned above, readily demonstrates the advantages of using the methods of this invention.

While the present invention has been described primarily with respect to the foregoing specific examples, it is to be understood that the present invention is in no way to be deemed limited thereto, but must be construed as broadly as all or any equivalents thereof.

What is claimed is:

1. A biaxially oriented thermoplastic film consisting essentially of polyethylene terephthalate and from about 0.1 to about 1 percent by weight of a polypropylene resin, said thermoplastic film having a thickness of between 2.5 ad 25 microns and having about two conductive points per square meter.

2. A biaxially oriented thermoplastic film consisting essentially of polyethylene terephthalate and from about 0.1 to about 0.4 percent by weight of a polypropylene resin, said thermoplastic film having a thickness of between 2.5 and 25 microns and having about two conductive points per square meter.

* * * * *